US 6,677,523 B1

(12) United States Patent
Gretz

(10) Patent No.: US 6,677,523 B1
(45) Date of Patent: *Jan. 13, 2004

(54) ELECTRICAL FIXTURE MOUNTING BOX AND MOUNTING ASSEMBLY

(75) Inventor: Thomas J. Gretz, Clarks Summit, PA (US)

(73) Assignee: Arlington Industries, Inc., Soranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/017,571

(22) Filed: Oct. 22, 2001

Related U.S. Application Data

(63) Continuation-in-part of application No. 09/784,981, filed on Feb. 16, 2001, now Pat. No. 6,355,883, which is a continuation-in-part of application No. 09/373,431, filed on Aug. 13, 1999, now Pat. No. 6,191,362.

(51) Int. Cl.⁷ ................................................. H01H 9/02
(52) U.S. Cl. ........................... 174/63; 174/58; 220/4.02
(58) Field of Search .............................. 174/63, 58, 48, 174/50, 53; 220/3.3, 3.9, 4.02; 248/906, 343; 52/39

(56) References Cited

U.S. PATENT DOCUMENTS

| 3,770,873 A | * | 11/1973 | Brown | ........................ 174/53 |
| 3,993,212 A | * | 11/1976 | Ryan | ............................ 174/58 |
| 4,063,660 A | * | 12/1977 | Ware | ............................ 174/58 |
| 4,666,055 A | * | 5/1987 | Lewis | ........................ 220/3.2 |
| 4,892,211 A | * | 1/1990 | Jorgensen | .................... 248/906 |
| 5,234,119 A | * | 8/1993 | Jorgensen et al. | ........... 220/3.9 |
| 5,522,577 A | * | 6/1996 | Roesch | ............................. 52/39 |
| 5,854,443 A | * | 12/1998 | Reiker | ......................... 174/58 |
| 5,939,671 A | * | 8/1999 | Gretz | ........................... 174/50 |
| 6,107,568 A | * | 8/2000 | Schnell et al. | ................ 714/63 |
| 6,191,362 B1 | * | 2/2001 | Gretz | .......................... 174/58 |
| 6,355,883 B1 | * | 3/2002 | Gretz | .......................... 174/58 |

* cited by examiner

Primary Examiner—Dean A. Reichard
Assistant Examiner—Angel R. Estrada

(57) ABSTRACT

An electrical junction box for mounting an electrical fan or other fixture to a structure including a channel having longitudinal teeth for engaging a rafter or other structural member to which the fan is to be attached. The engagement of the mounting box channel with the rafter resists lateral movement in a more substantial fashion thereby assuring that less stress is placed on the electrical box mounting screws. The longitudinal teeth positively engage the rafter when the electrical box is slideably inserted over the rafter. A hole is provided for further securing the electrical box to the rafter with a more conventional screw. A mounting assembly including holsters for providing temporary storage of mounting fasteners is also described. The mounting fasteners may be removed at the job site and used to complete the installation of a fixture to the junction box.

4 Claims, 7 Drawing Sheets

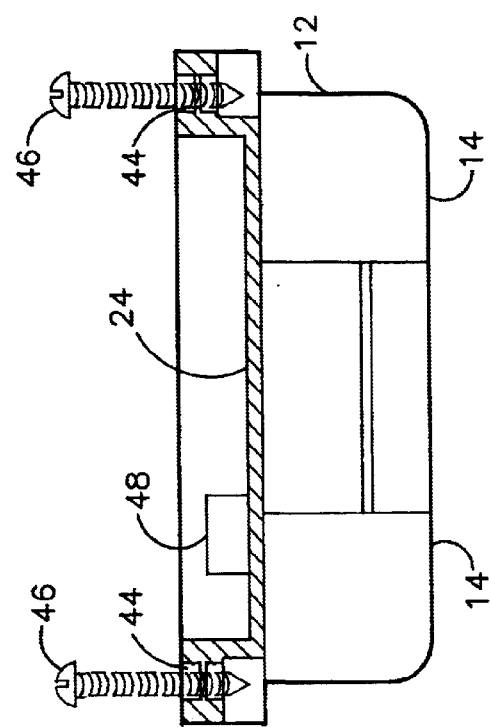
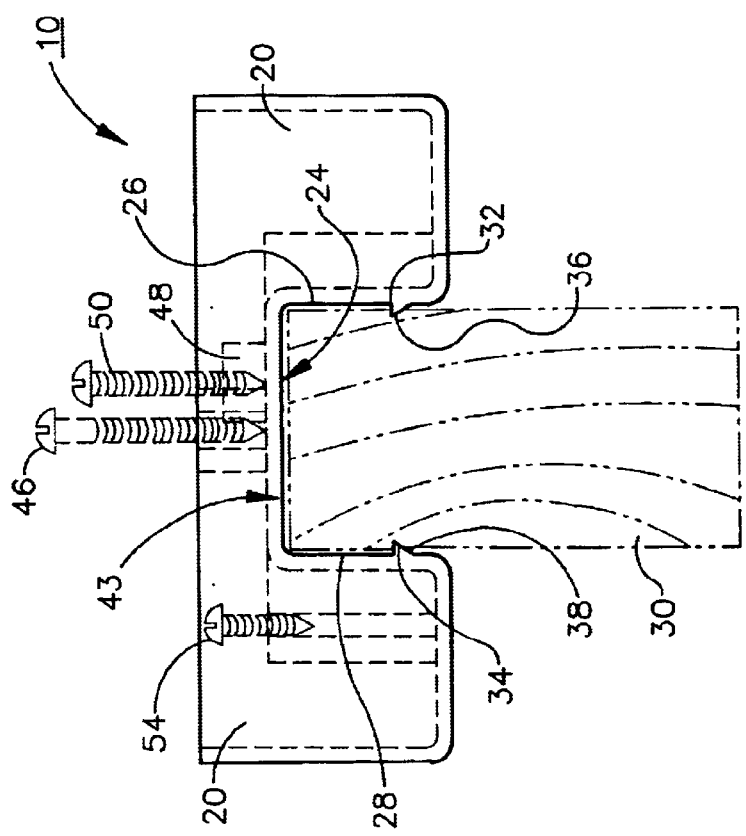

ELECTRICAL FIXTURE MOUNTING BOX AND MOUNTING ASSEMBLY

This application is a continuation-in-part of U.S. patent application Ser. No. 09/784,981 filed Feb. 16, 2001, now U.S. Pat. No. 6,355,883, which is a continuation-in-part of U.S. patent application Ser. No. 09/373,431 filed Aug. 13, 1999, now U.S. Pat. No. 6,191,362.

FIELD OF THE INVENTION

The present invention relates to electrical device mounting assemblies and methods for their installation, and more particularly to a mounting assembly or block for ceiling fans, light fixtures and the like that require stable, heavy duty mounting structures. A preferred embodiment includes a pre-packaged mount assembly that includes fasteners that are securely fastened to the mount assembly for shipment and are easily driven in place into a support member or repositioned and used to secure a fixture to both the mount assembly and a support member.

BACKGROUND OF THE INVENTION

Mounting structures for electrical devices have met increasing demands for strength and stability with the advent and common installation of ceiling fans particularly lighted such devices, and large chandeliers. While each of these electrical fixtures or devices has its own unique set of mounting problems, ceiling fans with their large heavy motors and often the addition of lighting devices, have posed a particular issue because of the large static loads which they represent when hung from a ceiling. Additionally, the fan rotation provides a dynamic load that also requires consideration when mounting such devices.

There have been numerous efforts in the prior art to provide adequate structure for the hanging or mounting of large electrical devices that represent large static and/or dynamic loads.

U.S. Pat. No. 4,892,211 To Jorgensen describes a ceiling box for mounting and supporting a ceiling fan on a ceiling. The ceiling box includes a top wall portion with a side wall portion surrounding the periphery of the top wall portion. The box is open at the end opposite the top wall portion and the side wall portion has a pair of flanges extending normal thereto into the open end of the box. These flanges have holes in them for receiving fan-supporting screws. In a first embodiment, a pair of threaded mounting screw holes is formed in the top wall portion and are each axially aligned with an unthreaded hole that extends through the respective flange. In a second embodiment, the holes in the flanges are also threaded for added support.

U.S. Pat. No. 5,183,233 to LaPalomento, describes a support for hanging an electrical fixture from a ceiling or wall and a method for suspending the fixture. The support comprises a panel that is intended to be affixed to the grid work of a house and a support affixed to the panel that holds the electrical fixture. A slot is provided on the rear of the panel to hold the panel flush against a flat surface and to allow electrical wiring to connect to the electrical fixture.

U.S. Pat. No. 5,234,119 to Jorgensen et al, describes a plastic ceiling box adapted to support a ceiling fan and designed to be mounted on a structural member, such as a ceiling joist. The ceiling box comprises a body member having a lower wall and a pair of sidewalls defining a recess for snugly receiving a ceiling joist. Box mounting holes for receiving box mounting fasteners are located at opposite sides and ends of the lower wall for attaching the ceiling box to the joist. Openings for receiving fan supporting fasteners are formed in the body member adjacent the box member and aid in attaching the body member to the joist. This overall arrangement provides sufficient support and strength to resist dynamic loads imposed by the ceiling fan even though the ceiling box is made of plastic.

U.S. Pat. No. 5,522,577 to Roesch describes a mounting assembly for supporting a ceiling fan that includes a support beam located inwardly of the ceiling surface a predetermined distance. An electrical box having a bottom wall is directly joined to and supported from the support beam. The box has sidewalls extending from the bottom wall through the ceiling substantially to the exposed ceiling surface and terminating in an open end. A rigid metal plate or disk member adapted for supporting and mounting a ceiling fan is positioned over the open end of the box. The disk member is of a size sufficient to have a peripheral portion extending radially beyond the side walls of the box and a plurality of mounting screws extend from the metal disk member through the interior of the box into connected engagement with the beam. The mounting screws support the disk member from the beam without reliance on the electrical box for support.

U.S. patent application Ser. No. 08/927,614 entitled "Ceiling Medallion Assembly" filed Sep. 11, 1997 in the name of Thomas J. Gretz describes a mounting assembly for holding an electrical device in place on a joist or stud. The assembly includes an electrical box having a planar base, preferably with three planar surfaces of different depths, a fastener device for temporarily securing an electrical box in place, a ceiling medallion for covering the electrical box, a second fastener device for temporarily securing the ceiling medallion to the electrical box and a fixation device for securely fastening the electrical box and a ceiling bezel to the joist or stud. The electrical box for mounting on the joist or stud includes: a generally rectangular housing with two opposite sides having a stepped appearance defining three different depths of the housing with a third side at a first shallow depth and a fourth side at a third deepest depth, a first back piece spanning the opposing sides at a first depth approximately equal to the thickness of the ceiling material, a second back piece spanning the opposites sides of the second depth that is greater than the first depth of the first back piece, the second depth being approximately equal to twice the thickness of the ceiling material and a third back piece spanning the opposite sides at a third depth that is greater than the second depth of the second back piece.

Although the foregoing methods and apparatus have all attempted to solve the problem of adequately mounting the increased loads of electrical fixtures, particularly fans, that place significant stresses upon the mounting structure as they rotate none provides for more than screw-type attachment of the electrical box to the rafter or other supporting structure. It would therefore be desirable to provide an electrical fan mounting assembly that because of its design and attachment scheme resists lateral movement that can result in loosening of the mounting screws.

Additionally, when an installer is preparing to install mounting structures and their associated electrical devices, he must frequently locate the proper size fasteners for the job. The mounting structures are typically mounted overhead, so it becomes very cumbersome and causes delays if an installer climbs a ladder with a mounting structure and finds that he does not have the proper fasteners for the job or he did not bring enough fasteners. There have been some attempts in the prior art to provide an electrical box that includes prepackaged fasteners to simplify the installation task.

U.S. Pat. No. 6,107,568 to Schnell et al. describes an electrical box and a holding device for use therewith. The holding device can be a flexible plastic bag with fixture mounting screws temporarily secured therein. A box mounting screw extends completely through the plastic bag and can be used to temporarily secure the electrical box and plastic bag to a joist. The fixture mounting screws can then be removed from the plastic bag and can be used to further fix the electrical box and fixture to the joist.

Others have captured screws with clips. The clips, which are typically integral projections from the electrical box, typically hold the screws with a frictional fit.

Prior art references that have attempted to simplify the installation of electrical boxes by providing fixture mounting screws in a separate container have several disadvantages. These include the possibility of the container either becoming separated from the electrical box or tearing, resulting in lost fasteners. Adding a container requires that a separate item be manufactured and provided with the electrical box therefore adding to the expense of the box. Additionally, the container must be disposed of after it is opened, thereby creating waste.

Clips used in prior art devices rely upon a frictional fit to temporarily hold the fastener. By relying upon a frictional fit, these clips also have the disadvantage that fasteners are capable of falling out during storage or shipping.

It would therefore be desirable to provide an electrical device mounting assembly that provides prepackaged fasteners that are not as easily separated from the assembly as prior art devices, are easily removed when put into use, and do not require a separate container that adds to expense and must be disposed of after use.

SUMMARY OF THE INVENTION

According to the present invention, there is provided an electrical junction box for mounting an electrical fan to a structure which junction box includes a channel further including longitudinal teeth that engage the rafter or other structural member to which the fan is to be attached. The engagement of the mounting box channel with the rafter resists lateral movement in a more substantial fashion thereby assuring that less stress is placed on the electrical box mounting screw(s). The longitudinal teeth positively engage the rafter when the electrical box is slideably inserted over the rafter. A hole is provided for further securing the electrical box to the rafter with a more conventional screw. A preferred embodiment of the electrical junction box provides prepackaged fasteners that are temporarily secured to the box. An installer can easily secure the box to a rafter with a self-contained initial fastener, make wiring connections, and then remove the self-contained fixture fasteners and secure the fixture and electrical box to a rafter.

DESCRIPTION OF THE DRAWINGS

FIG. 3 is a partially phantom side view of the electrical junction box of the present invention installed over a rafter or other structural member.

FIG. 4 is a cross-sectional view of the electrical junction box of the present invention along the line A—A of FIG. 2.

Table of Nomenclature

Figure 1:
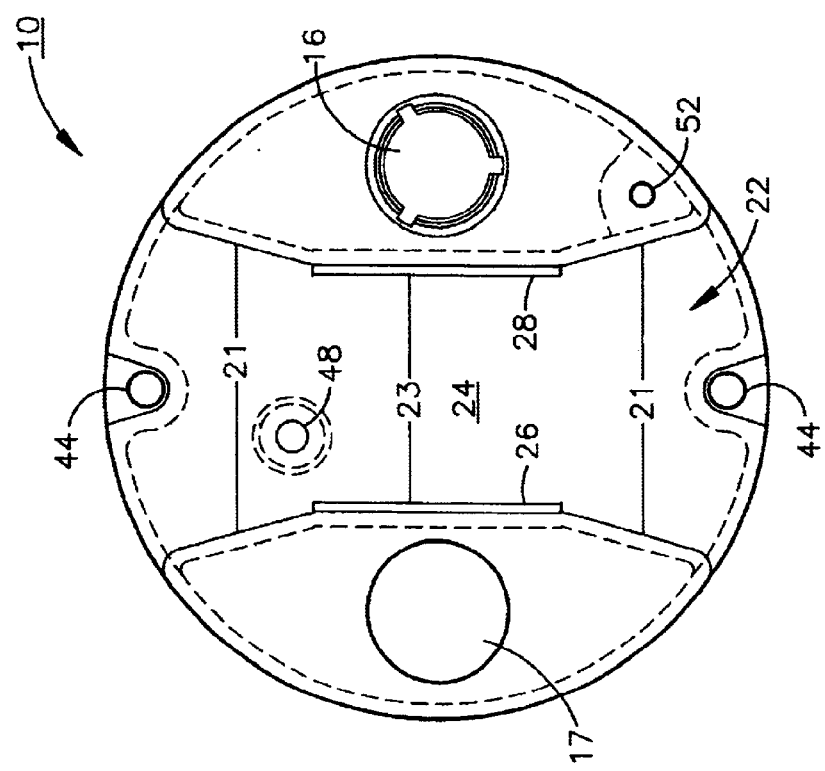
FIG. 1 is a bottom view of the electrical junction box of the present invention.

The following is a listing of part numbers used in the drawings along with a brief description:

| Part Number | Description |
|---|---|
| 10 | electrical junction box |
| 12 | side wall |
| 14 | top |
| 15 | bottom surface (of electrical box) |
| 16 | knockout |
| 17 | aperture (at knockout) |
| 18 | low profile connector |
| 20 | volume |
| 21 | dimension |
| 22 | channel |
| 24 | channel bottom |
| 26 | channel side wall |
| 28 | channel side wall |
| 30 | rafter |
| 32 | longitudinal teeth |
| 32A | abbreviated teeth |
| 34 | longitudinal teeth |
| 34A | abbreviated teeth |
| 36 | front surfuce (of teeth) |
| 38 | front surface (of teeth) |
| 40 | rear surface (of teeth) |
| 42 | rear surface (of teeth) |
| 43 | under surface (of channel) |
| 44 | hole |
| 44A | elongated apertures |
| 46 | fixture mounting screw |
| 48 | screw-retaining boss |
| 50 | initial mounting screw |
| 52 | final hole |
| 54 | grounding screw |
| 56 | holster |
| 57 | label |
| 58 | ceiling fan |
| 62 | base (of ceiling fan) |
| 64 | central bore (of boss) |
| 66 | length of bore (of boss) |
| 68 | top inner bore (of holster) |

-continued

Table of Nomenclature

The following is a listing of part numbers used in the drawings along with a brief description:

| Part Number | Description |
|---|---|
| 68A | inner wall (of top inner bore) |
| 70 | bottom inner bore (of holster) |
| 70A | inner wall (of bottom inner bore) |
| 72 | point (of fixture mounting screw) |

DETAILED DESCRIPTION

As shown in the bottom view of the electrical junction box 10 of the present invention in FIG. 1, the junction box 10 comprises an outer periphery defined by side wall 12 and a top 14 of which the bottom surface 15 is visible. The electrical junction box 10 includes a knockout 16 and a low profile connector 18 inserted into knockout aperture 17. Low profile connector 18 may be replaced with a more conventional knockout, if desired. Similarly, a second low profile connector may be used in lieu of knockout 16. The particular shape of electrical junction box 10 is not critical and a square or octagonal configuration is similarly useful providing the channel defined hereinafter is appropriately located therein.

Figure 2:
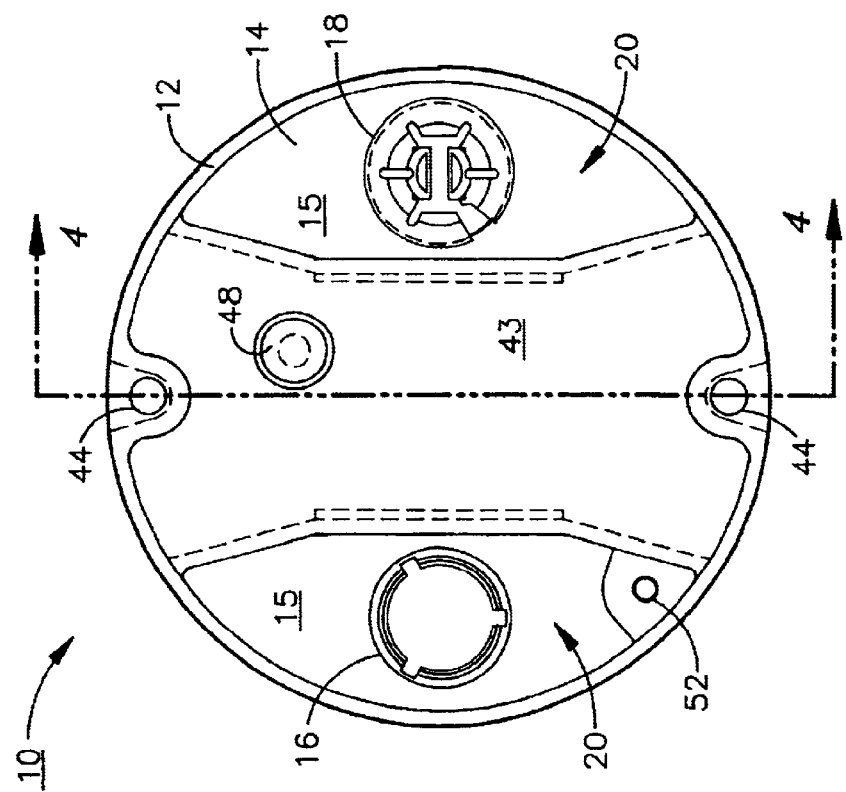
FIG. 2 is a top view of the electrical junction box of the present invention.

Top 14 and consequently volume 20 of electrical box 10, as defined by top 14 and side wall 12 and as shown in FIG. 1, are bisected by channel 22, as shown in FIG. 2. The channel 22 includes a channel bottom 24 and generally parallel channel side walls 26 and 28. Channel side walls 26 and 28 extend orthogonally or at right angles from top 14 toward the interior of electrical box 10 and bisect the interior volume of the box 10. The distance between channel side walls 26 and 28 is approximately equal to the width of a rafter 30 or other structural member to which electrical box 10 will be applied, as shown in FIG. 3. The electrical junction box 10 of the present invention can be constructed in various sizes, depending on users' preferences, but, for a 16 cubic inch volume electrical box, the side wall(s) 12 are about 2.625 inches deep and the channel 22 is about 2.0 inches deep. The electrical junction box 10 of the present invention can be constructed to accommodate various internal volumes, depending on users' preferences, in which case the side walls and channel depth would vary appropriately.

As shown in the attached drawings, channel 22 is depicted as being "flared", i.e. its extremities are wider, dimension 21, than the width of the central portion of channel 22, dimension 23, that is designed to engage rafter 30. This "flaring" or widening of channel 22 at its extremities is preferred for ease of installation.

As shown in FIG. 3, the interior side of channel side walls 26 and 28 include longitudinal teeth 32 and 34 that are shaped to slide over rafter 30 upon application of electrical box 10 over rafter 30 as shown in FIG. 3, but to "bite" into rafter 30 when force is applied to withdraw electrical box 10 from rafter 30. Teeth 32 and 34 accordingly have front surfaces 36 and 38 that present an angle of about 30° to rafter 30 upon application thereto and rear surfaces 40 and 42 that present an angle of about 90° to rafter 30 when an attempt is made to remove electrical box 10 from rafter 30 after application of electrical box 10 over rafter 30 as shown in FIG. 3. As will be apparent to the skilled artisan, multiple longitudinal teeth or a suitable configuration of short teeth could also be used to accomplish the objectives of the present invention, and all of these alternatives should be considered equivalents of the "longitudinal teeth" described herein.

As shown most clearly in FIG. 4, the under surface 43 of the channel bottom 24 includes at its extremities in the area of side wall(s) 12, a pair of holes 44 of a size and spacing to receive fixture mounting screws 46 of a subsequently installed electrical fan (not shown). Holes 44 are typically slightly less than 0.25 inches to frictionally engage screws 46 that are typically #10 and about 0.25 inches in diameter. Holes 44 are preferably about 0.50 inches deep as this is the depth needed to hold screws 46 in the typical installation.

The under surface 43 of channel bottom 24 also includes a screw-retaining boss 48 for insertion of initial mounting screw 50 that serves to initially fasten electrical box 10 securely to rafter 30 after application thereof to rafter 30.

A final hole 52 is preferably provided for frictional engagement of a grounding screw 54 that is used in the final installation of the electrical fan (not shown).

Figure 5:
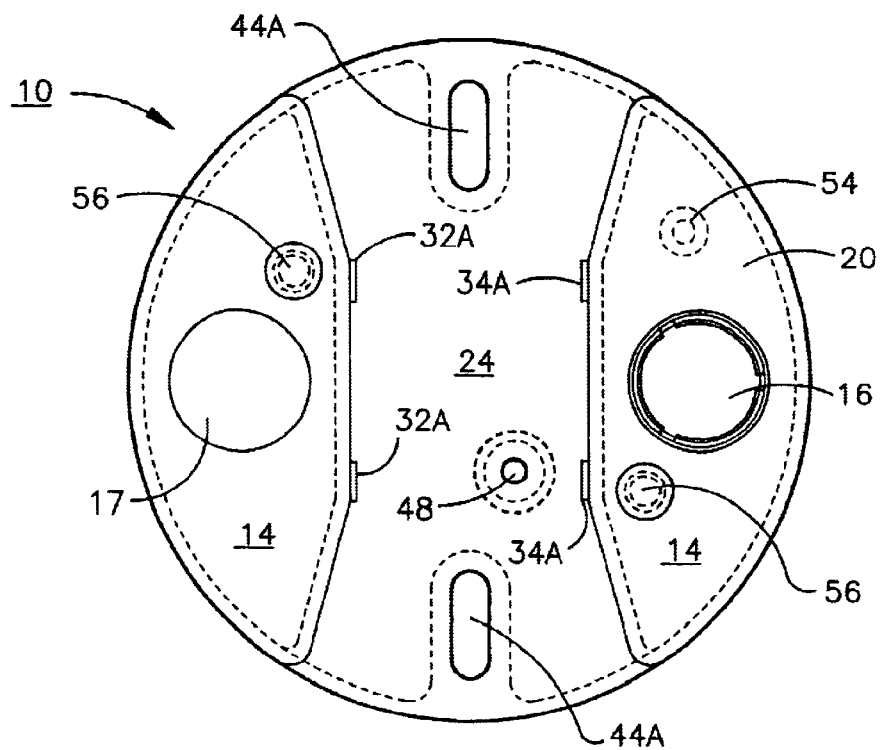
FIG. 5 is a top view of a second embodiment of the electrical junction box of the present invention incorporating prepackaged mounting fasteners.
Figure 6:
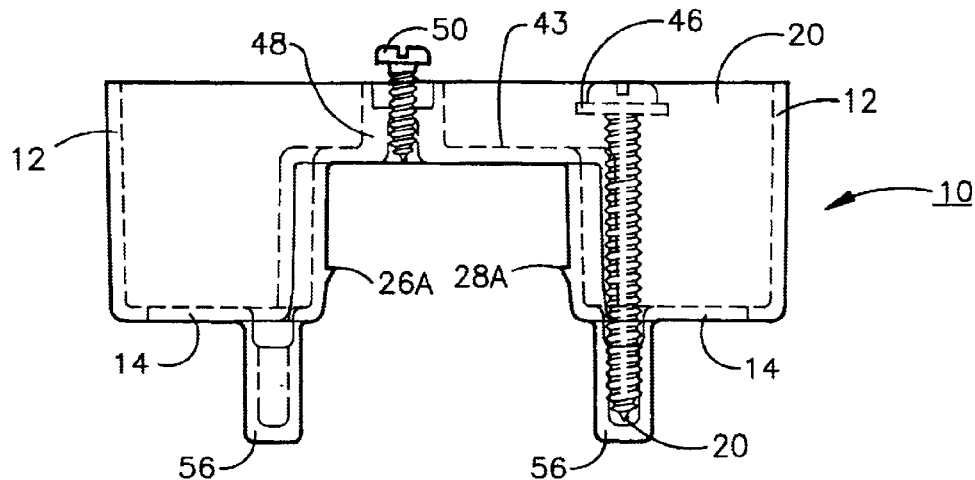
FIG. 6 is a partially phantom side view of the electrical junction box of FIG. 5.

Referring now to FIG. 5, a top view of a second embodiment of the electrical junction of the present invention, i.e. a prepackaged electrical junction box 10 or mounting assembly includes, in addition to the elements previously described, a pair of holsters 56 defined by extended recesses in top 14, best seen extending from the electrical box 10 in the side view of FIG. 6. Additionally, apertures 44A, in lieu of being round are now preferably elongated to form slots to permit variability in the location of fixture mounting screws or bolts 46 mounted therein as previously described. Also, teeth 32A and 34A in FIGS. 5 and 6 are abbreviated versions of elongated teeth 32 and 34 previously described that provide the same utility but with less material while rendering installation somewhat easier.

The purpose and utility of the holsters 56 is to provide a location for the placement of mounting bolts or screws 46 during shipment and prior to installation. As is well recognized by those employed in the electrical trades, mounting bolts or screws for the attachment of ceiling fans or other electrical fixtures are often misplaced or left at a position remote from the installation site, for example on the floor, requiring time and effort to locate the screws or bolts or the acquisition of replacements to complete an installation. The inclusion of mounting bolts or screws, frictionally engaged in the holsters 56 assures the immediate availability of such fasteners at the appropriate time in the installation process. Similarly, it is contemplated that initial mounting screw 50 that is used to initially fasten electrical junction box 10 securely to a rafter (not shown) be similarly included by frictional engagement in boss 48 during shipping and prior to installation as shown in FIG. 6.

Figure 7:
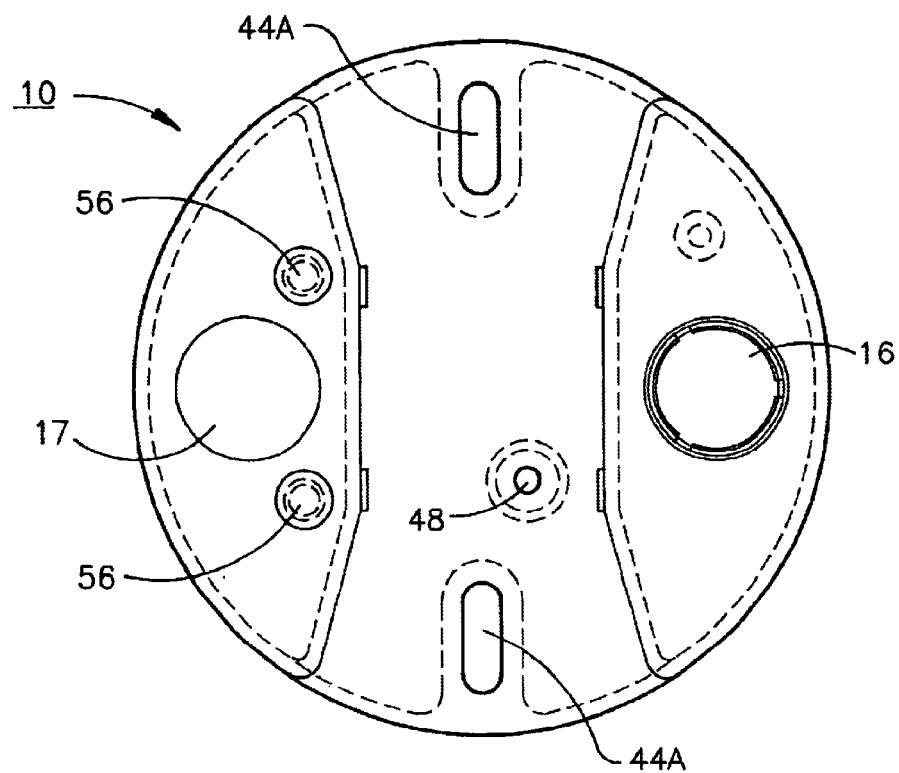
FIG. 7 is a top view of the preferred embodiment of the electrical junction box of the present invention incorporating prepackaged mounting fasteners.

Referring now to FIG. 7, a third and preferred embodiment of the a prepackaged electrical junction box or mounting assembly 10 includes one or more holsters 56 (two shown) similar to the second embodiment, but unlike the second embodiment the holsters 56 both project from one side of the junction box 10. As shown in FIG. 7, if there is more than one holster 56, they should be positioned in the box 10 in an unambiguous manner, such as spaced closely together and at one side of the box 10. The holsters 56 in the embodiment shown in FIG. 7 are typically 1.25 inches or less apart and located on one side of the box 10 as shown. The holsters 56 are intended to provide temporary storage receptacles for the fixture mounting screws 46 (one shown in FIG. 8) during storage and shipment of the box 10 and are not meant to be a position for anchoring the screws 46 into a support member (not shown). Efforts should therefore be made when constructing the box 10 to position the holsters 56 on one side of the box and relatively close together to dissuade a homeowner from attempting to use the holsters 56 as a position to anchor the box 10 to a support member. The fact that the end of the holster 56 is capped and extends from the box also makes it highly unlikely that a homeowner would mistakenly use the holsters 56 as a position to anchor the fixture mounting screws.

Figure 8:
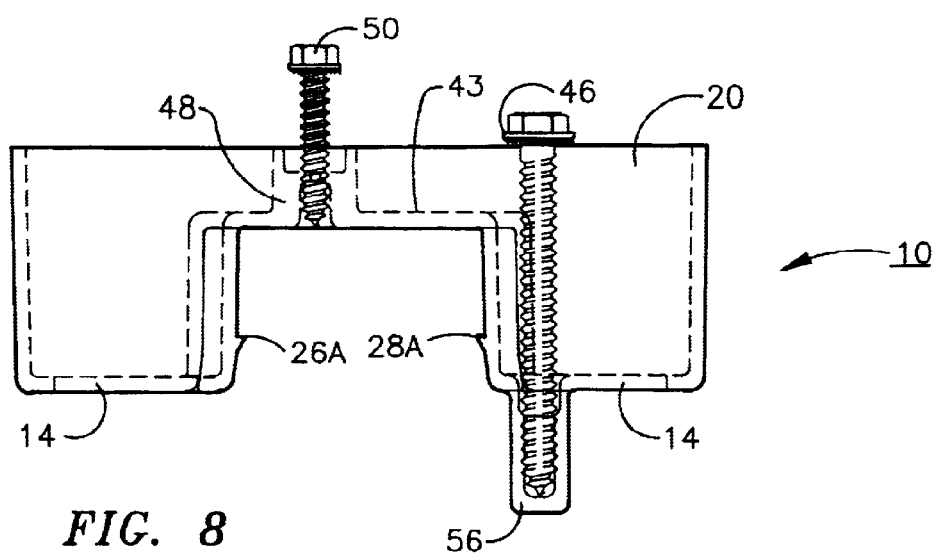
FIG. 8 is a partially phantom side view of the preferred embodiment of the electrical junction box as viewed from the bottom of FIG. 7.

FIG. 8, a partially phantom side view of the preferred embodiment of the electrical junction box 10 as viewed from the bottom of FIG. 7, depicts the holsters 56 on one side of the electrical box 10 (one holster is obscured behind the forward one in this view) nearer to the channel 22 than the side wall 12.

Figure 9:
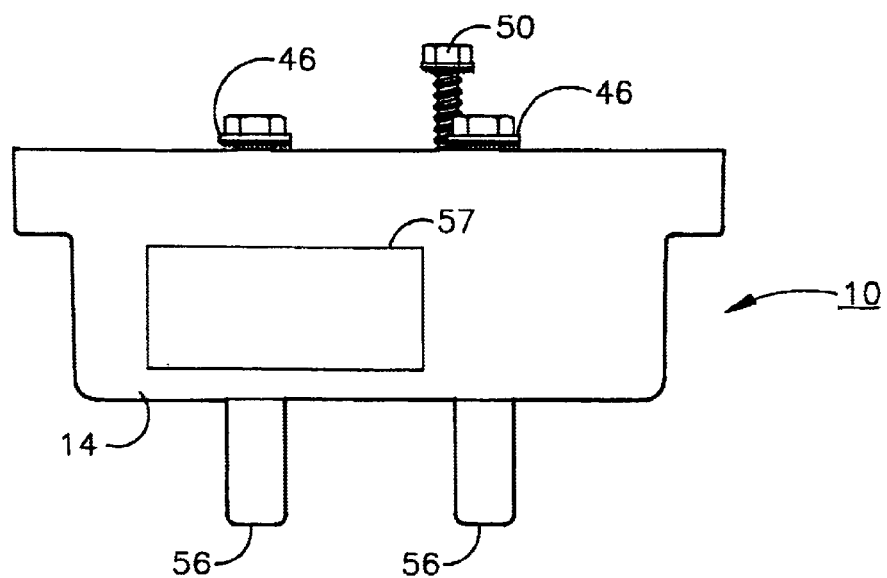
FIG. 9 is a partially phantom side view of the preferred embodiment of the electrical junction box as viewed from the right side of FIG. 7.

FIG. 9, a partially phantom side view of the preferred embodiment of the electrical junction box as viewed from the right side of FIG. 7, shows the holsters 56 extending from the top 14 of the electrical box 10. The heads of the fixture mounting screws 46 are visible on the bottom 15 of the electrical junction box 10 as is the initial mounting screw 50 used for initially securing the box 10 to a support structure. Since there are no loose members when storing and shipping the electrical box, a label may be attached to the box 10. Placing a label on the box eliminates the need to have the box 10 in a separate package with instructions included in the package. The label 57 is preferably attached to the side wall 12 of the electrical box adjacent the holsters 56 as shown in FIG. 9. Locating the label 57 as shown places it in the most conspicuous position for viewing by an installer as the box 10 is positioned on a rafter (not shown in FIG. 9). The label 57 preferably contains instructions listing the steps involved in correctly installing the box 10 including 1) securing the box to a rafter with the initial mounting screw 50, 2) installing wiring per NEC and local code, 3) drilling two ⅛-inch diameter holes through the elongated apertures 44A (shown in FIG. 7), 4) removing two long fixture mounting screws 46 to mount the box 10, 5) mounting the fan/fixture bracket (not shown) into the drilled holes, and 6) mounting the fax/fixture per the manufacturer's instructions.

Figure 10:
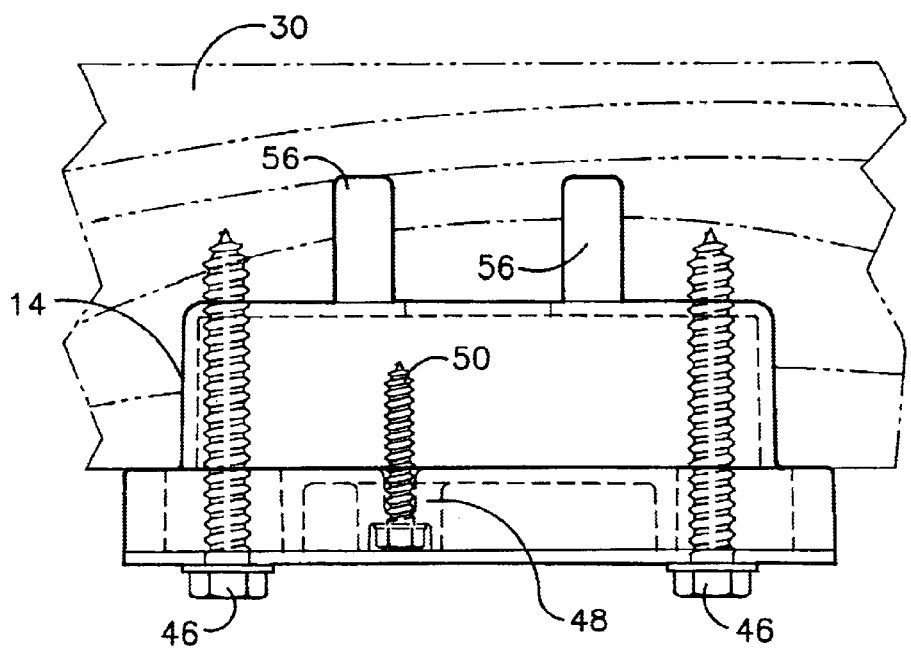
FIG. 10 is a side view depicting the electrical junction box of FIG. 7 installed on a joist.

When the preferred embodiment of the electrical box 10 is mounted on a rafter 30, as shown in FIG. 10, the holsters 56 extend vertically along one side of the rafter 30. As the holsters 56 are located near the channel (not shown in FIG. 10), they are nearly out of sight when viewed from below, which is the typical perspective of the box 10 after it has been mounted overhead. The initial mounting screw 50 and fixture mounting screws 46 are shown, in phantom lines, extending into the rafter 30.

Figure 11:
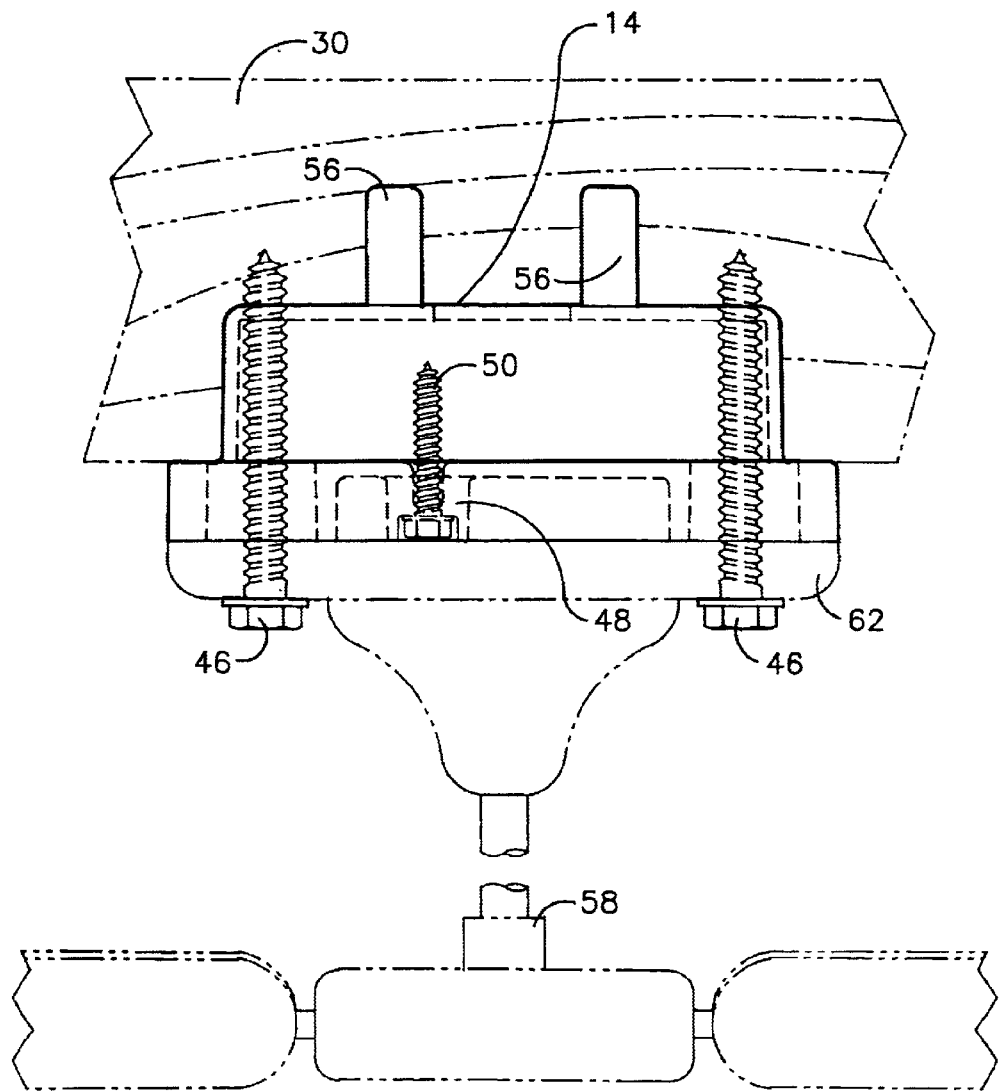
FIG. 11 is a side view depicting the electrical junction box of FIG. 7 installed on a joist and showing a portion of a ceiling fan installed on the box.

Referring to FIG. 11, a side view is shown of the electrical junction box 10 of FIG. 7 installed on a rafter 30 with a portion of a ceiling fan 58 installed on the box 10. The preferred embodiment of the electrical junction box 10 of the present invention will come as a prepackaged unit including the initial mounting screw 50 (in phantom lines) and the fixture mounting screws 46 (in phantom lines). The end portion of initial mounting screw 50 is screwed into a boss (not shown in FIG. 11) and the end portions of the fixture mounting screws 46 are screwed into the holsters 56. The electrical junction box 10 is typically constructed of a tough plastic such as polycarbonate, and, with the proper construction of the boss (not shown) and holsters 56, this material typically holds the screws 46, 50 tightly when only an end portion is screwed in. The installer therefore receives the electrical junction box 10 with the initial mounting screw 50 and fixture mounting screws 46 affixed to the box 10 by their end portions. As a result, the installer does not need to search for a properly sized screw or, after locating the screws, risk misplacing the screws or losing them prior to installation. The installer simply places the junction box 10 against a rafter 30 so that the rafter 30 rests in the channel (not visible in FIG. 11) of the box 10 and then drives screw 50, which is preinstalled in its boss, fully into the rafter 30 thus securing it to the rafter 30 and freeing the installer's hands. The ceiling fan 58 or other device can then be positioned near the junction box 10 and electrical connections can be completed. Holes in the ceiling fan base 62 are then aligned with elongated apertures (not visible in FIG. 11) in the electrical box 10 and fixture mounting screws 46 are installed through the fixture base 62 and driven into the rafter 30. With the initial mounting screw 50 and the fixture mounting screws 46 both tightened into the rafter 30, the electrical box 10 is capable of supporting fixtures weighing up to 70 pounds. For supporting a 70 pound load, the initial mounting screw 50 is typically a #8×¾-inch and the fixture mounting screws typically are #12×2-inch sheet metal screws.

Figure 12:
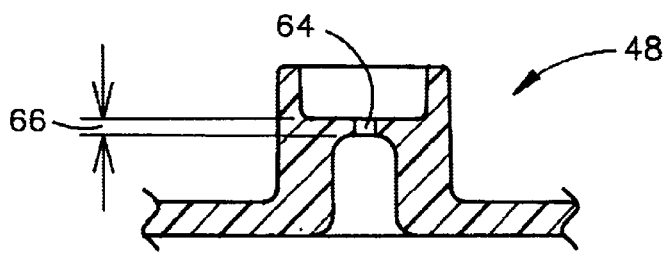
FIG. 12 is a side sectional view of a screw-retaining boss located in the channel bottom for insertion of a screw that serves to initially fasten the electrical box of FIG. 7 to a rafter.
Figure 13:
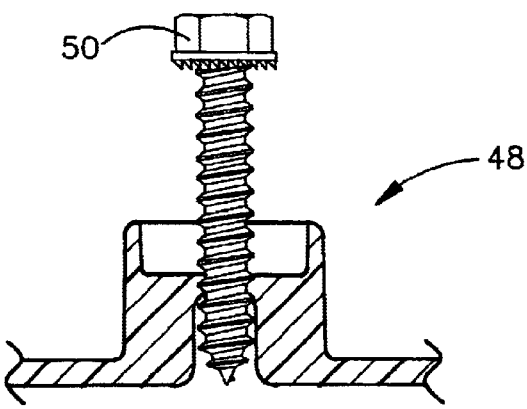
FIG. 13 is a side sectional view of the screw-retaining boss of FIG. 12 with a screw inserted partially in the boss.

FIG. 12 is a side sectional view of the screw-retaining boss 48 that will hold a screw (not shown) that serves to initially fasten the preferred embodiment of the electrical box to a rafter. For use with a #8 self-tapping machine screw the central bore 64 of the boss 48 typically measures 0.065 inch in diameter and the length 66 of the bore typically measures 0.050 inch. If constructed of a tough plastic such as polycarbonate, a self-tapping sheet metal screw can be screwed into the boss 48 to be available for use when the electrical box is installed. As shown in FIG. 13, a screw 50 inserted partially in the boss 48 will be held in place and ready to use until an installer places the top (not shown) of the electrical box against a rafter and drives the screw into the rafter.

Figure 14:
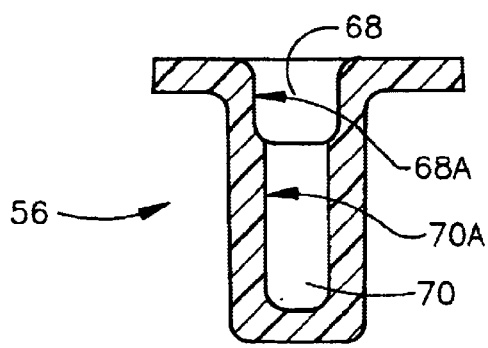
FIG. 14 is a side sectional view of a screw-retaining holster located in the top of the, electrical box of FIG. 7.
Figure 15:
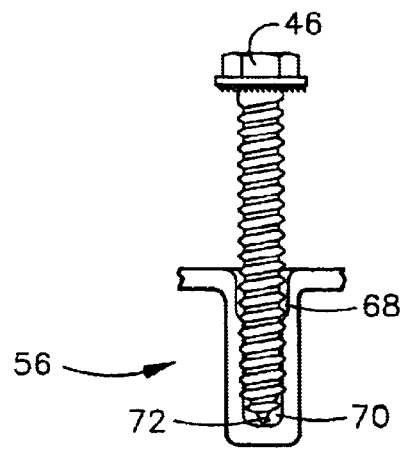
FIG. 15 is a side sectional view of the screw-retaining holster of FIG. 14 with a screw inserted partially therein.

Referring to FIG. 14, a side sectional view is shown of a screw-retaining holster 56 that will be used to hold a fixture mounting screw (not shown) for shipment with the electrical box to a job site. As used within this disclosure, a holster 56 is defined as an enclosure integral with an electrical box for frictionally holding a threaded fastener so that it does not become separated from the box, including a central bore open on at least one end for receipt of the threaded fastener and preferably closed on its second end for protecting the end of the threaded fastener. For use with a #12×2-inch sheet metal screw 46, as shown in FIG. 15, the top inner bore 68 of the holster 56 typically measures 0.250 inch and the bottom inner bore 70 typically measures 0.187 inch. Preferably, the interior walls 68A, 70A of the top 68 and bottom 70 inner bores of the holsters 56 are smooth. A smooth surface 68A on the top inner bore 68 enables the fixture mounting screw 46 to easily slip into the holster 56 presenting no obstruction to the screw 46. A smooth surface 70A on the bottom inner bore 70 enables the fixture mounting screw 46 to rapidly and easily self-tap and make its own thread. The combination of the smooth surface 68A and dimensions of the top inner bore 68 allows the fixture mounting screw 46, with a nominal major thread diameter of 0.2115 inch, to enter the top inner bore 68 easily. The fixture mounting screw 46 can then be screwed partially into the bottom inner bore 70, where it makes its own threads in the smooth surface 70A, and advanced until it is held securely for shipment. The fixture mounting screw 46 can then be easily removed by an installer at the job site and repositioned to the proper location to secure a ceiling fan or other fixture to a rafter through the elongated apertures (not shown in FIG. 15).

As shown in FIG. 15, once inserted in the holster 56, the point 72 of the fixture mounting screw 46 is enclosed within and protected by the holster 56. The holsters 56 therefore protect the ends 72 of the fixture mounting screws 46 during storage and shipment of the box. The mounting assembly 10 of this disclosure may have relatively deep side walls 12 as shown in FIG. 8 or it may be manufactured with deeper or shallower side walls as desired for the application. As previously mentioned and as depicted in FIG. 8, the points 72 of the fixture mounting screws 46 are protected by the holster 56 but essentially the entire length of the screw 46 is recessed within and protected by the side walls 12. The side walls 12 can be made deeper if preferred to provide more space for electrical connections or shallower if desired. For shallower boxes, the holsters 56 typically extend farther from the 14 top of the box 10 and accommodate the point 72 and a greater length of the screw 46. The holsters 56 can be provided with a number of electrical boxes, including thin mounting boxes (not shown) that do not include a channel for accommodating a rafter.

The purpose and utility of the holsters 56 is to provide a location for the placement of fixture mounting bolts or screws 46 during shipment and prior to installation. As is well recognized by those employed in the electrical trades, mounting bolts or screws for the attachment of ceiling fans or other electrical fixtures are often misplaced or left at a position remote from the installation site, for example on the floor, requiring time and effort to locate the screws or bolts or the acquisition of replacements to complete an installation. The inclusion of mounting bolts or screws, frictionally engaged in holsters 56 assures the immediate availability of such fasteners at the appropriate time in the installation process. Similarly, it is contemplated that initially mounting screw 50 that is used to initially fasten electrical junction box 10 to a rafter 30 through screw-retaining boss 48 be similarly included by frictional engagement in boss 48 during shipping and prior to installation as shown in FIG. 6.

As will be apparent to the skilled artisan, the concept of prepackaging required fasteners with various electrical junction boxes and the like by frictional engagement of the fasteners in suitably designed and located apertures is also novel and forms part of the instant invention.

As the invention has been described, it will be apparent to those skilled in the art that the same may be varied in many ways without departing from the spirit and scope of the invention. Any and all such modifications are intended to included within the scope of the appended claims.

What is claimed is:

1. A mounting assembly comprising:
   A) an electrical junction box including a top and at least one side wall defining an interior volume;
   B) at least one holster included in said box;
   C) a fastener frictionally engaged in said holster for temporary storage with said box prior to installation, said fastener capable of being removed from said holster and repositioned for mounting a fixture to said box; and
   D) said holster including an integral tubular projection from said top, said tubular projection open to and communicating with said interior volume at a first end joining said top and closed at a second end away from said box, said tubular projection of a length to enable said fastener to be completely enclosed by said side wall and disposed entirely within said volume when inserted therein.

2. The mounting assembly of claim 1 wherein said holster includes
   an inner bore having a cylindrical wide diameter portion at said first end and a cylindrical narrow diameter portion at said second end;
   said wide diameter portion is of a wider diameter than said fastener and said narrow diameter portion is of a narrower diameter than said fastener; and
   said wide diameter portion includes a smooth surface and said narrow diameter portion includes a smooth surface.

3. A mounting assembly comprising:
   A) an electrical junction box including a top and at least one side wall defining an interior volume;
   B) at least one holster included in said box;
   C) a fastener frictionally engaged in said holster for temporary storage with said box prior to installation, said fastener capable of being removed from said holster and repositioned for mounting a fixture to said box;
   D) said holster including an integral tubular projection from said top, said tubular projection open to and communicating with said interior volume at a first end joining said top and either open or closed at a second end away from said box;
   E) a pair of approximately parallel walls extending at right angles from said top and a bottom wall joining said parallel walls, said parallel walls and said bottom wall comprising a channel bisecting said interior volume; and
   F) teeth extending from at least a portion of each of said parallel walls, said channel being of a width that said teeth frictionally engage the vertical sides of a rafter when said channel is lifted thereon, said frictional engagement resists lateral movement of said box with respect to said rafter.

4. A mounting assembly comprising:
   A) an electrical junction box including a top and at least one side wall defining an interior volume;
   B) at least one holster included in said box;
   C) a fastener frictionally engaged in said holster for temporary storage with said box prior to installation, said fastener capable of being removed from said holster and repositioned for mounting a fixture to said box;
   D) said holster including an integral tubular projection from said top, said tubular projection open to and communicating with said interior volume at a first end joining said top and either open or closed at a second end away front said box;
   E) a pair of approximately parallel walls extending at right angles from said top and a bottom wall joining said parallel walls, said parallel walls and said bottom wall comprising a channel bisecting said interior volume;
   F) teeth extending from at least a portion of each of said parallel walls, said channel being of a width that said teeth frictionally engage the vertical sides of a rafter when said channel is lifted thereon, said frictional engagement resists lateral movement of said box with respect to said rafter; and
   G) said teeth including a long front surface extending from said parallel walls at a point near the top of said channel and a short rear surface extending from said parallel walls essentially parallel with said channel bottom, said long front surface thereby presenting a slight inclined surface which allows said rafter to slip into said channel, said short rear surface presenting a sharp inclined surface thereby biting into said rafter and holding said rafter in said channel.

* * * * *